(12) United States Patent
Birman et al.

(10) Patent No.: US 10,025,017 B2
(45) Date of Patent: Jul. 17, 2018

(54) TWO GAUGE ILLUMINATION WITH ONE LIGHT GUIDE

(71) Applicant: Continental Automotive Systems, Inc., Auburn Hills, MI (US)

(72) Inventors: Vyacheslav B Birman, Auburn Hills, MI (US); Cristian Leonard Fitz, Timisoara (RO)

(73) Assignee: Continental Automotive Systems, Inc., Auburn Hills, MI (US)

( * ) Notice: Subject to any disclaimer, the term of this patent is extended or adjusted under 35 U.S.C. 154(b) by 288 days.

(21) Appl. No.: 14/711,945

(22) Filed: May 14, 2015

(65) Prior Publication Data

US 2016/0229337 A1     Aug. 11, 2016

(30) Foreign Application Priority Data

Feb. 11, 2015   (EP) ..................... 15465502

(51) Int. Cl.
| | |
|---|---|
| F21V 8/00 | (2006.01) |
| G01D 11/28 | (2006.01) |
| B60Q 3/66 | (2017.01) |
| B60Q 3/14 | (2017.01) |

(52) U.S. Cl.
CPC ............... *G02B 6/001* (2013.01); *B60Q 3/14* (2017.02); *B60Q 3/66* (2017.02); *G01D 11/28* (2013.01)

(58) Field of Classification Search
CPC ......... B60Q 3/005; B60Q 3/044; G02B 6/001
USPC ...................................... 362/23.01
See application file for complete search history.

(56) References Cited

U.S. PATENT DOCUMENTS

| | | | | |
|---|---|---|---|---|
| 2,999,148 | A * | 9/1961 | Kay ...................... | B60Q 3/004 116/287 |
| 5,546,888 | A * | 8/1996 | Skiver .................... | B60Q 3/004 116/284 |
| 6,302,551 | B1 * | 10/2001 | Matumoto ............ | B60K 37/02 116/286 |
| 6,422,710 | B1 * | 7/2002 | Herzog .................. | B60K 37/02 362/23.09 |
| 6,461,006 | B1 * | 10/2002 | Matumoto ............ | B60Q 3/004 362/23.16 |
| 7,458,695 | B2 | 12/2008 | Birman et al. | |
| 7,537,353 | B2 | 5/2009 | Birman et al. | |
| 2006/0285308 | A1 * | 12/2006 | Birman .................. | B60K 35/00 362/23.15 |
| 2008/0174416 | A1 * | 7/2008 | Pala ....................... | G01D 11/28 340/461 |
| 2011/0157911 | A1 * | 6/2011 | Mezouari ............... | G01D 11/28 362/559 |

(Continued)

OTHER PUBLICATIONS 15465502.1 European Search Report dated Jul. 24, 2015.

*Primary Examiner* — Jong-Suk (James) Lee
*Assistant Examiner* — Christopher E Dunay

(57) ABSTRACT

A light guide assembly for illuminating two gauges utilizing a single light guide includes of a two pairs of light sources such as LEDs, OLED's, quantum dots or other useful light sources functioning to emit light in opposite directions. A light guide receives the light emitted by the LEDs and leaks light out of its open surfaces. A protrusion from the light guide which leaks light in a specific orientation depending on its geometry illuminates a second gauge. An opaque gauge which covers the main portion of the light guide and is located above the light guide.

1 Claim, 5 Drawing Sheets

(56) References Cited

U.S. PATENT DOCUMENTS

| | | | |
|---|---|---|---|
| 2012/0188770 A1* | 7/2012 | Kunitachi | B60K 37/02 362/293 |
| 2013/0155351 A1* | 6/2013 | Garelli | G02B 6/001 349/64 |
| 2014/0240954 A1* | 8/2014 | Gullick | G02B 6/0005 362/23.21 |
| 2016/0054505 A1* | 2/2016 | Scavino | B60K 37/02 362/610 |

\* cited by examiner

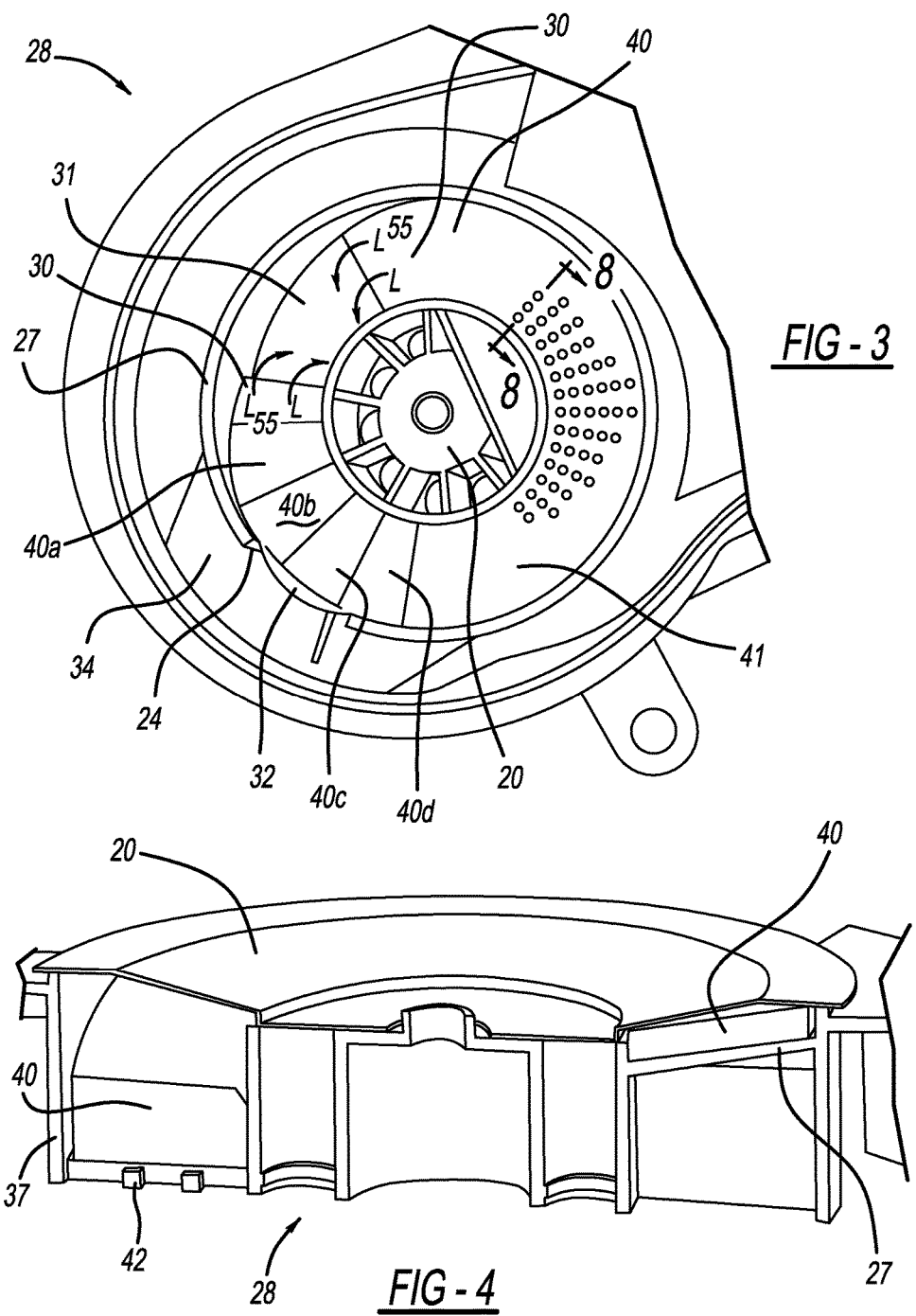

TWO GAUGE ILLUMINATION WITH ONE LIGHT GUIDE

CROSS-REFERENCE TO RELATED APPLICATIONS

This application claims the benefit of European Patent Application No. 15465502.1 filed Feb. 11, 2015, the disclosure of which is hereby incorporated by reference in its entirety.

FIELD OF THE INVENTION

The present invention relates to illumination of instrument panel gauges in a vehicle.

BACKGROUND OF THE INVENTION

The invention relates to illuminating an instrument panel and the specific gauge elements within the panel via a light guide source of light.

Vehicle display panels often have various instrumentation which inform the user of various properties of the vehicle including gauges such as speedometers, tachometers, gas meters etc. These gauges are often constructed of opaque plastic with translucent parts used to indicate the necessary information. The gauge is illuminated from below in order to make the information on the gauge clearly visible and have a pleasing aesthetic appearance. In order to illuminate the gauges, light guides in combination with LEDs are employed. The LED emits light which is scattered within the light guide; light then leaks from the light guide as the light travels through it, illuminating the area from where the light is leaked.

Several problems exist within the typical light guide and LED construction summarily described above. As light circulates through the light guide and is leaked the areas further from the light guide light entrance leaking less light, causing uneven illumination of the gauge. This uneven illumination provides an undesired look which the current invention remedies.

The method of illumination by light guide as described above generally only illuminates a single area in function resulting in multiple light guides needed for multiple areas or to cover a full 360 degree area of a gauge. The need for multiple light guide assemblies in order to illuminate gauges results in additional material costs and more space consuming parts in the valuable real-estate of the instrument panel.

SUMMARY OF THE INVENTION

The present invention provides a solution to this problem, lighting multiple gauge areas utilizing a single light guide assembly; In the disclosed invention two gauges specifically are illuminated while only employing a single light guide.

A light guide assembly for illuminating two gauges utilizing a single light guide according to the present invention consists of a two pairs of LEDs functioning to emit light in opposite directions is provided in the present invention. A light guide which receives the light emitted by the LEDs and leaks light out of its open surfaces is provided. A protrusion from the light guide which leaks light in a specific orientation depending on its geometry. An opaque gauge which covers the main portion of the light guide and is located above the light guide is provided. A secondary gauge below and adjacent to the light guide portion at the protrusion is illuminated by the light guide protrusion.

In one embodiment the light guide illumination assembly according to the present invention can simultaneously light two gauge areas while providing an even light distribution of these areas providing a desirable aesthetic appearance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a plan view of the gauge in FIG. 2 of the gauge assembly with the opaque gauge face removed;

FIG. 4 is a cross sectional view taken along line 4-4 of FIG. 3 of the gauge assembly illustrating the light guide and the LED section wherein the illumination is provided;

DETAILED DESCRIPTION OF THE PREFERRED EMBODIMENTS

The following description of the preferred embodiment(s) is merely exemplary in nature and is in no way intended to limit the invention, its application, or uses.

Referring now to the figures, the environment in which the illumination light guide assembly is generally shown at 10 in which a driver's side dashboard is generally indicated at 12. Within the dashboard 12 an instrument panel 14 is provided which contains various gauges and display indicators 16. The gauges 16 are illuminated by the present invention as will be appreciated by those skilled in the art in view of the description below.

Figure 1:
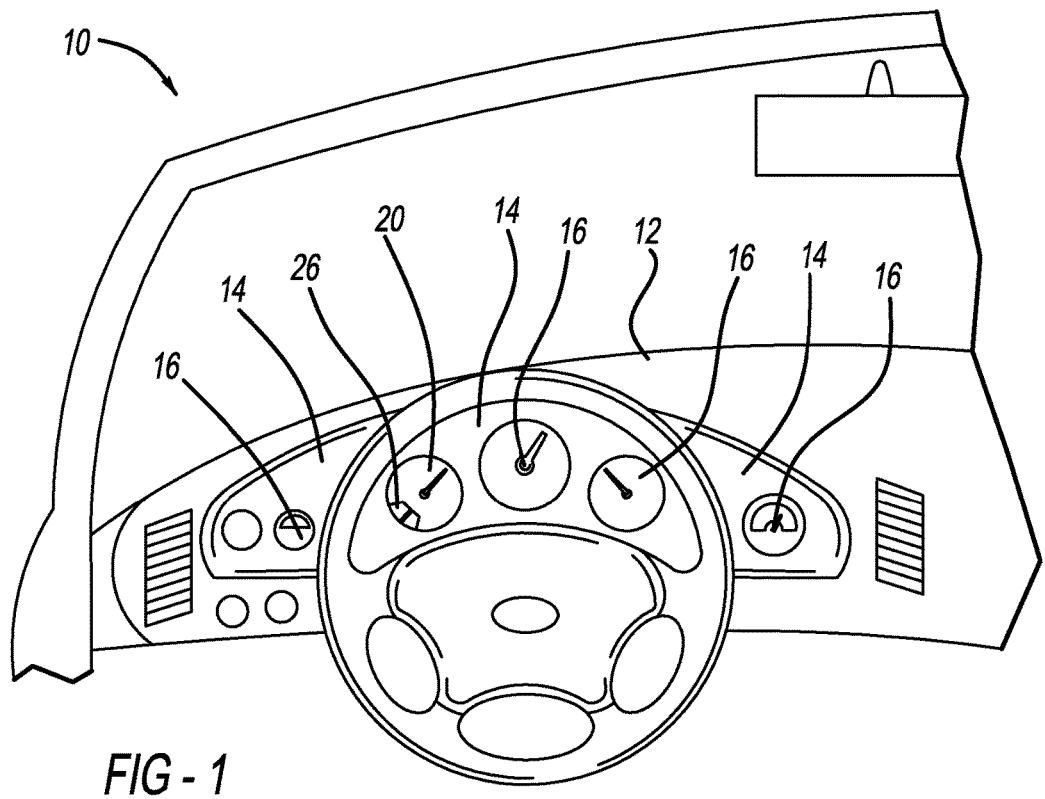
FIG. 1 is a plan view of a partially broken away instrument panel with various gauges in a car's dashboard wherein the illumination device of the present invention is utilized.
Figure 2:
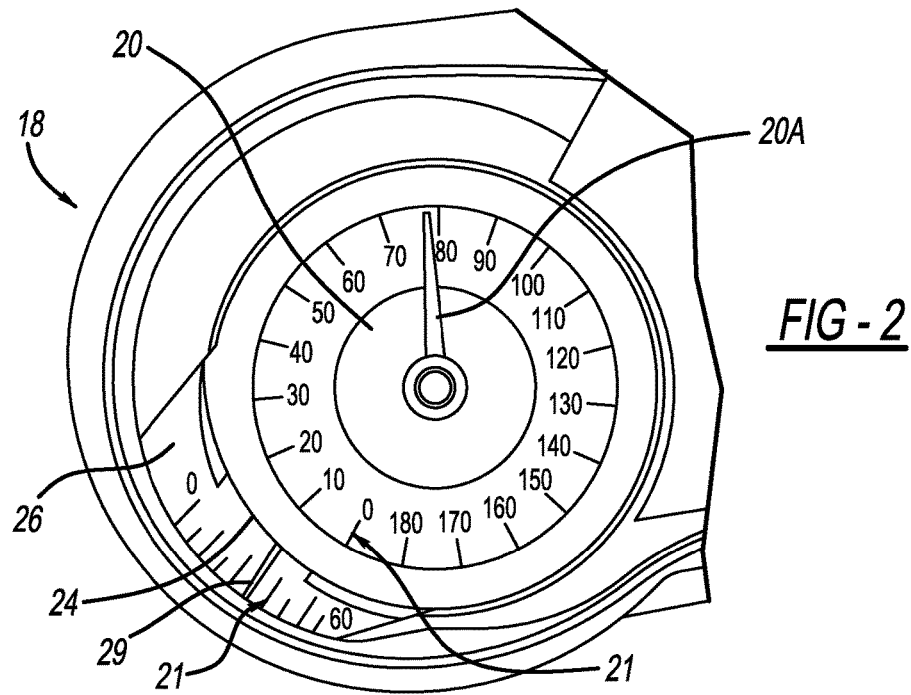
FIG. 2 is a plan view of a gauge assembly in accordance of the present invention.

The illumination light guide assembly is generally illustrated in FIG. 2 as 18. The gauge generally indicated at 20 covers the light guide assembly 28 which is under the gauge. The gauge 20 indicates a gauge pointer 20A and the driver visible portion of gauge 20 is an opaque layer which includes 360 degrees of indicia from (illustrated for example 0-200 miles per hour and associated gradient scale). The indicia and gradient scale are scribed in the gauge layers such that light will illuminate the 0-200 numbers and gradient scale. In the embodiment shown the gauge face is shown as an inverted frustoconical shaped surface however, other surface shapes may be used as will be appreciated by those skilled in the art.

A secondary gauge 26 is provided which is illuminated by way of a break 24 in the encasement 27. The light guide projects light from under the gauge 20 and out of protrusion 32 in the side of the light guide from the break 24 in the encasement 27 to illuminate the secondary gauge area 26 respectively. Referring now to FIG. 3 a sectional top down view is shown wherein the cover of the gauge 20 is removed and the illuminated light guide assembly is generally shown as 28. The light guide assembly 28 includes the light guide 40 which guides light emitted from light sources, such as LED's 42, OLED's, Quantum Dots, combinations of these and/or any other suitable sources of light, which are configured to direct light in to light entry areas of the light guide 40 the spaced tapered sections 30 around the light guide 40 illuminating the area above it including the primary gauge 20, the light guide 40 also includes an arcuate continuing center portion 41 between tapered light entrances 30. The light guide is tapered in the section in the area 30 with the LEDs 42 such that the light leakage from the light guide 40 is even with respect to other sections of the light guide 40. The LEDs 42 are located near the light entrance and underneath the tapered section of the light guide. The LEDs 42 project light 55 throughout the light guide and into the area not containing the light guide 30 this area remains lit at an even level with comparison to the rest of the light guide. This is due to the tapering which acts to adjust the amount of leaked light at tapered areas 30 to a level corresponding with light leakage from the rest of the light guide 40.

Figure 8:
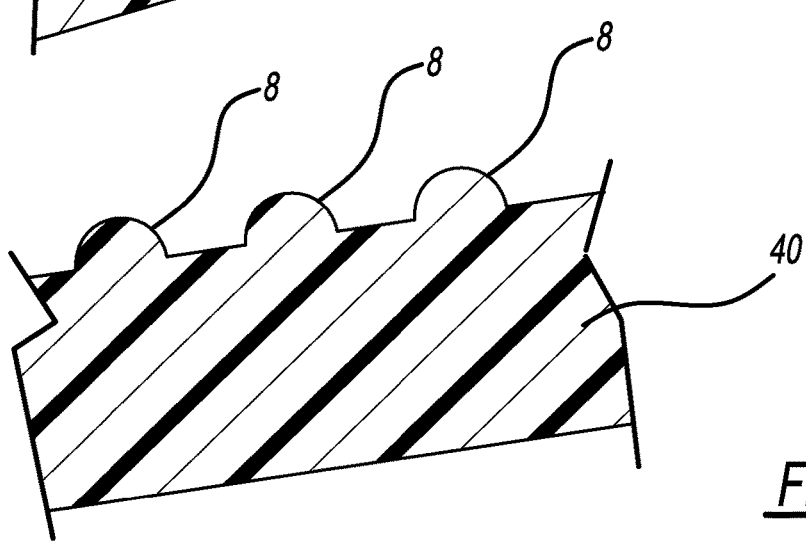

Referring now to FIG. 3 the sectional views are shown in order to illustrate the varying nature of the light guide, i.e. the surfacing which is taken place in order to allow for even emission of light. Surfacing is also shown in the form of micro lenses in the line across 8 which is also shown in FIG. 8. The micro lenses 8 provide for varied light leakage across the surface allowing for equal emission of light across the whole light guide and an even illumination of the gauge above. This view also shows the protrusion 32 from which light is leaked from the light guide onto the secondary gauge 26 by means of a break 24 in the reflective encasement 27 of the light guide. The encasement 27 in this case functions to reflect light off of its surface effectively allowing light to only be leaked in cases where the encasement is not present, namely the top of the light guide, and the break in the encasement 24 at protrusion 32 to allow light to escape from the protrusion.

FIG. 4 illustrates a cross sectional view of the illumination light guide assembly 28 generally shown as 28 and its function in lighting the primary gauge 20. The LEDs 42 emit light which is transmitted into the light guide 40 at light entrances 41 as the light travels through the light guide 40 to the light entrance of the light guide 40 light leakage occurs, illuminating the gauge above the light guide 20. The light guide is encased in a white reflective material 27 which causes the light leaked at this surface to be reflected back into the light guide 40, allowing only light to be leaked where the light guide is not enclosed by the reflective casing 27. The light entrance 41 of the light guide 40 closer to the LED's 42 looks like a larger section only because it is taken at the curved portion where it is being tapered downward resulting in a larger cross section. The tapering is enacted in order to light the area in between the pair of LED's 42 in the area designated 31 in FIG. 3 as such a curved or tapered surface allows light leakage along it outside arcuate path.

Figure 5:
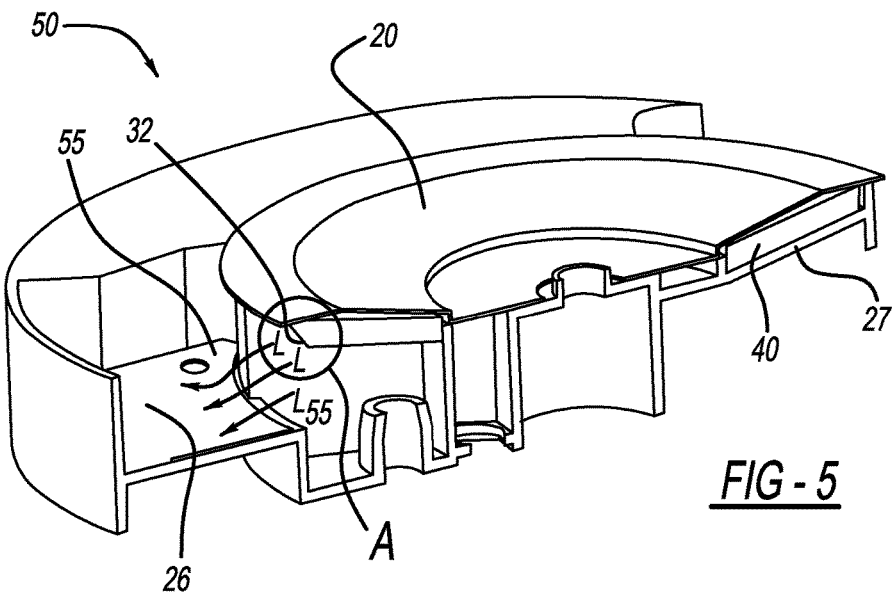
FIG. 5 is a cross-sectional view taken along line 5-5 of FIG. 3 which illustrates the gauge assembly. Both gauges are shown in this view along with the light guide showing the illumination of both areas by the single light guide.

FIG. 5 illustrates a cross sectional view of the illumination light guide assembly generally shown as 50 and its function in lighting the secondary gauge 26. The light guide 40 leaks light as it travels within the light guide illuminating the primary gauge 20 as it propagates through the light guide. Light leaks out of the protrusion 32 upon reaching that section of the light which is not encased by the white reflective casing 27 allowing it to illuminate the secondary gauge area 26 below it.

Figure 6:
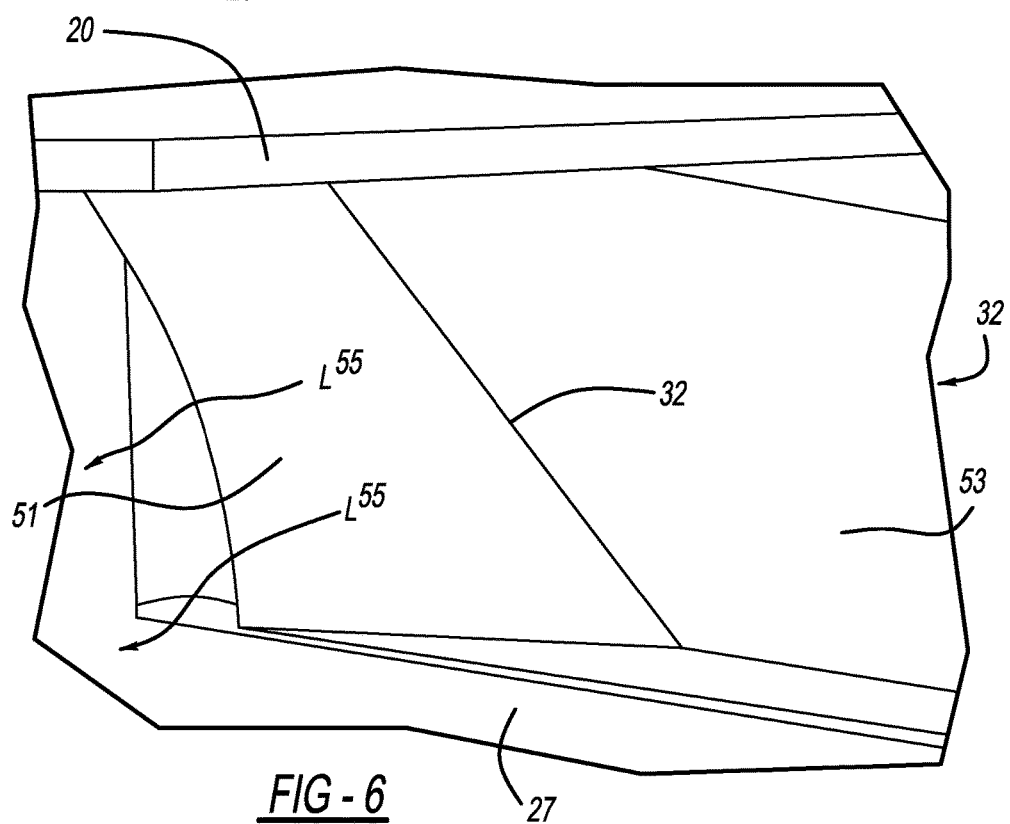
FIG. 6 is a detailed side view which illustrates the light which is leaked from the light guide in order to provide illumination.

FIG. 6 is an area view taken from the area enclosed in FIG. 5 labeled A. This section further illustrates the protrusion section of the light guide generally indicated as 32. The light guide protrusion is both section 53 and 51 wherein the section 51 is the angled section which projects light 55 out of the protrusion in a specific direction in this case toward secondary gauge 26. The reflective casing 27 covers the remaining part of the light guide from which the protrusion extends but does not cover the protrusion itself. Above the protrusion is the primary gauge cover 20 the cover being opaque at this section prevents light from being leaked above the protrusion except through the side 21, thus the light is directed down into the secondary gauge area 26 for illumination of this gauge.

Figure 7A:
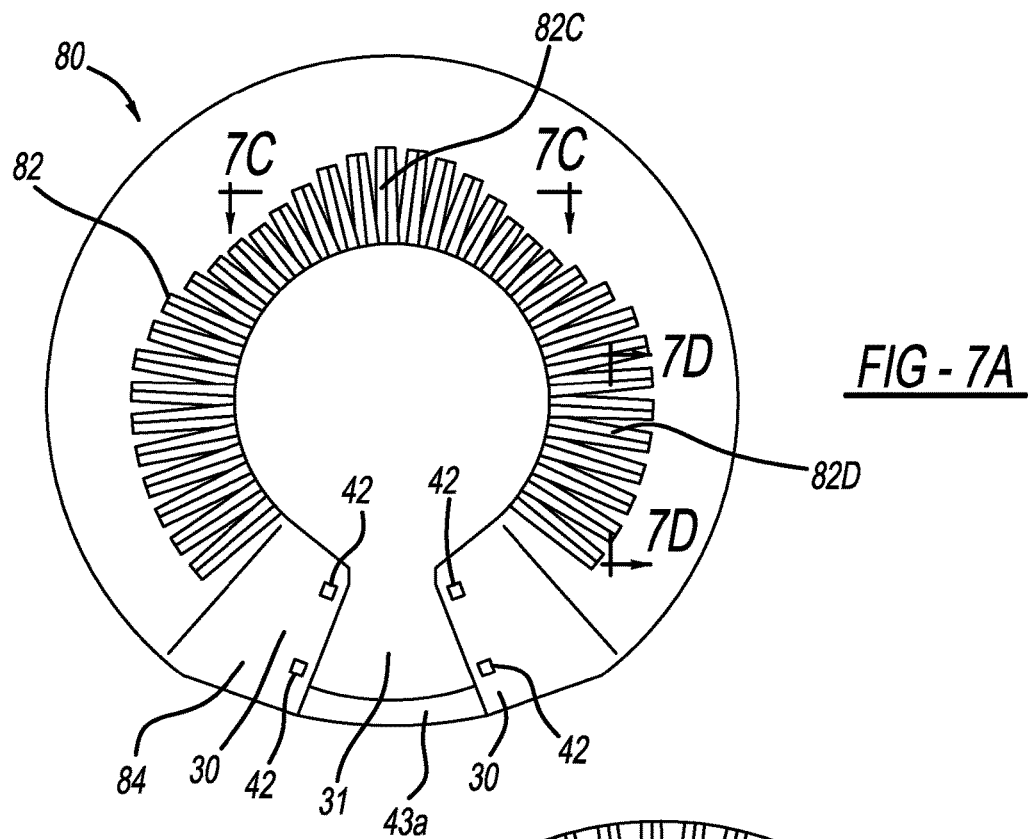
FIG. 7A is a top view which of patterns of surfacing on the top of the light guide in order to vary levels of light leakage and thus an even amount of illumination from the light guide.
Figure 7B:
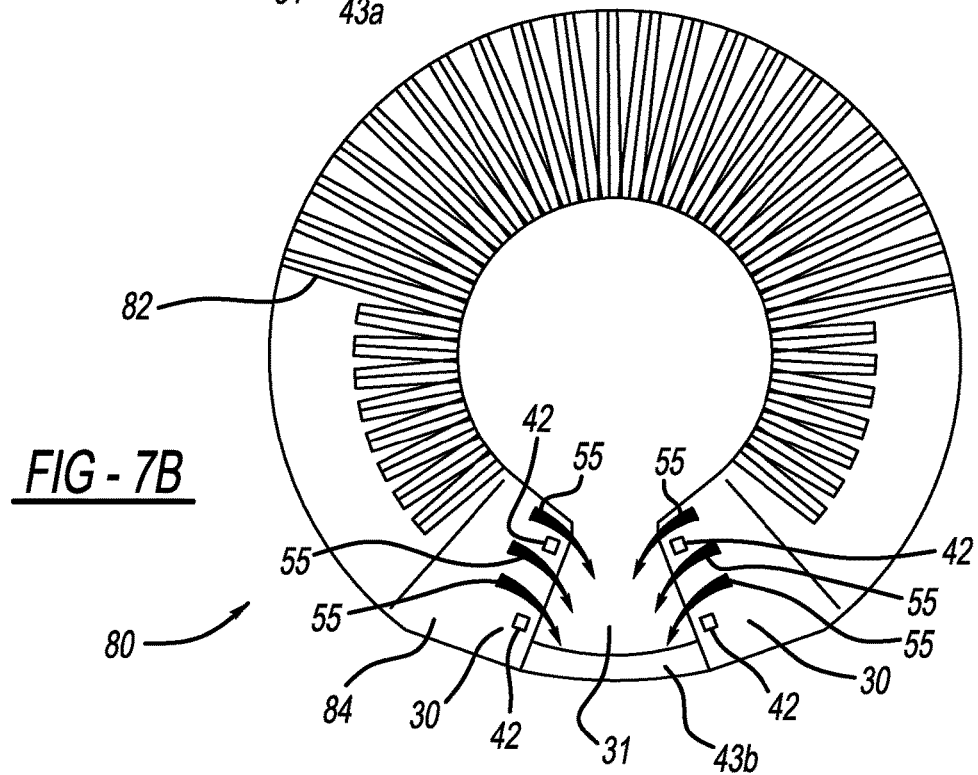
FIG. 7B is a top view showing an alternative embodiment.
Figure 7C:
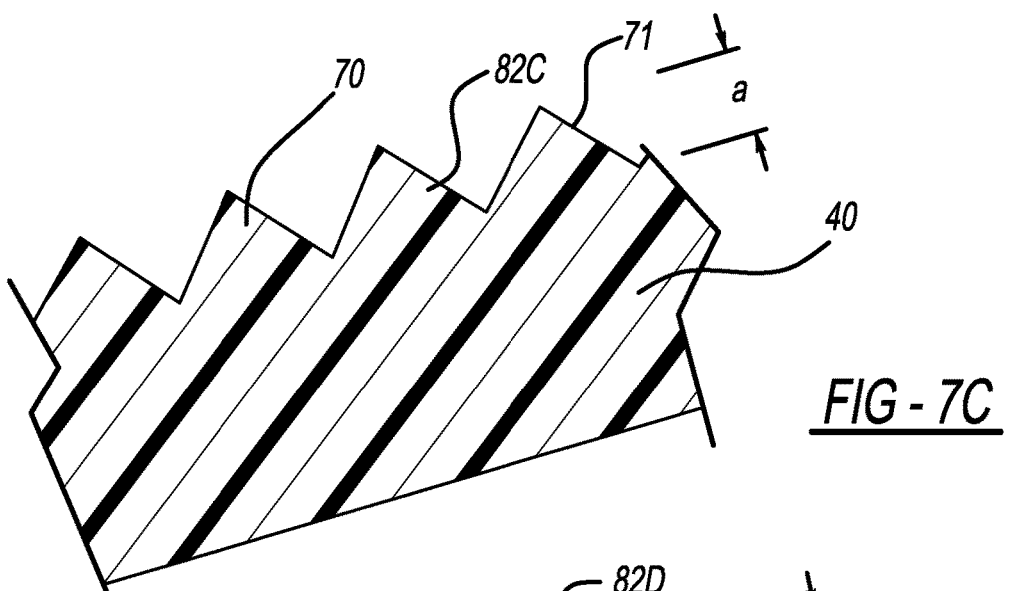
FIG. 7C is a detailed sectional view of the light guide surface taken along line 7C-7C of FIG. 7A.
Figure 7D:
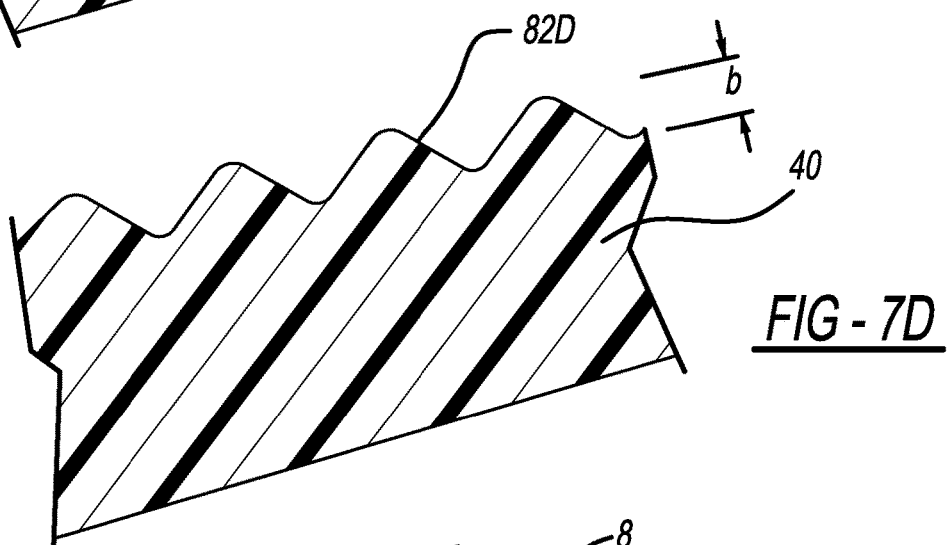
FIG. 7D is a detailed sectional view of the light guide surface taken along line 7D-7D of FIG. 7A; and, FIG. 8 is a detailed sectional view of the light guide surface taken along line 8.

The illumination light guide assembly of the current invention not only acts to illuminate multiple areas of the primary and secondary gauges with a single light guide but also to evenly illuminate an area by providing even light leakage throughout the light guide. This even illumination is accomplished by introducing surfacing to the light guide to increase light leakage via an increase in surface area. An example of surfacing done to a light guide is shown in FIG. 7A and FIG. 7B wherein a pattern of ribs generally indicated as 82 is cut or otherwise formed into the surface of the light guide generally shown as 40. The rib sections cut into the light guide increase surface area toward the middle of the arcuate portion 41 of the light guide and allows more light to be leaked where more or longer ribs are present. The light leakage can be tuned to give a different effect as in FIG. 7A wherein light is leaked readily throughout the light guide with the ribs causing light to be leaked more in certain areas for a pleasing aesthetic effect. In FIG. 7B the more light is leaked where the ribs 82 are longer which in this case is farther from the LED's 42 which light the light guide 40. The further light travels from LEDs 42 into the light guide 40 the less light remains. Since more light has been leaked when light reaches the portion with the longer rib sections increased light leakage of the little light that remains causes the same amount of light to be emitted at the center as well as to the light entrances 41 providing for an even emission of light across the entire upper surface of the light guide. A cross section across lines 7C and 7D can be seen in FIG. 7C and FIG. 7D illustrating the construction of the ribs at those points. The ribs in section 7C are of depth and amplitude shown as a and more frequent creating more surface area in the same length then in 7D which has a depth and amplitude of b allowing for more light leakage toward the center portion of the arcuate circular surface 41 (B-B) there on its way (C-C) to the area (B-B). This causes an even amount of light to be leaked in each case. In cross sections shown the amplitude of the ridges designated a in FIG. 7C is larger than in b of FIG. 7D.

Referring to FIGS. 7A and 7B it will be readily appreciated that the light entrance ends 41 are connected to one another by way of a web of the light guide material 43a, 43b. The web of material 43a, 43b is typically a square or rectangular cross section about 3 mm by 3 mm which mechanically connects the light entrance ends for providing greater mechanical stability and strength when used in the final application. Also, since this web is made from the light guide material a small amount of light is emitted from this material to assist in illuminating this area of the gauge.

In operation, the illumination light guide assembly functions to light the two different gauges in different ways. The primary gauge 20 is lit in the following manner. Initially the two sets of LEDs 42 emit light into the light guide 40 in opposing directions. The light guide 40 internally reflects the light into itself and leaks light out of its exposed surface as light passes through the light guide. The light guide is encased in a reflective material 27 which reflects light leaked from the bottom and sides of the light guide 40 ensuring that only light from the top of the light guide is leaked. Thus the light leaks out of the upper surface of the light guide illuminating the gauge 20 element above it. The portion 31 devoid of light guide 40 is let in an upward direction by light leaked at the curved edge 30.

The secondary gauge 26 is lit in a different manner which utilizes the same existing light guide 40 in the illumination light guide assembly. The secondary gauge 26 in the present invention is located axially beneath the primary gauge 20 as an exemplary case. The light is emitted from the LEDs 42 in opposing directions into the light guide and internally reflected. Light leaks from exposed surfaces in order to illuminate the area around it. According to the present invention the light guide is encased such that light is only released from the top portion of the light guide excepting a small portion wherein a protrusion 32 from the side of the light guide exists and at the tapered portion 30 at light entrances 41 of the light guide where the LEDs are placed in order to light the area in between the LED's 30. This protrusion 32 in the light guide is constructed in such a way that light is leaked onto a specific area below the light guide protrusion 32 specifically the second gauge area 26.

Light is leaked throughout illumination light guide assembly at even levels by surfacing the surface of the light guide in such a way that more light is leaked (of the remaining light) the more that light has been leaked by the time the light reaches that portion of the light guide 40. The surfacing 82 increases the overall surface area of the top portion of the light guide providing a larger area for light leakage. The surfacing methods to increase overall light leakage which can be applied in the present invention are ribs, micro lenses, roughness, or light retardant layers. Ribbing hollows out the surface increasing outer surface area, micro lenses are applied to the surface in an alternate embodiment (FIG. 3, FIG. 8) creating more surfaces, roughness increases surface area via abrasion to the surface, and light retardant layers reduce light being emitted at varying levels throughout the surface. The functionality of the differing surfacing methods remains the same the result being an even emission of light and therefore even illumination of the surface.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An instrument panel gauge assembly comprising:
    a light guide comprising:
        a flattened torus made of a light-transmitting material, the flattened torus having a geometric center and first and second substantially annular and substantially parallel surfaces, the first and second substantially annular and substantially parallel surfaces having an inner circumferential edge and an outer circumferential edge, the circumferential edges being substantially centered on the geometric center of the flattened torus, the flattened torus, the annular parallel surfaces and the circumferential edges all being truncated at first and second locations around the center to provide the flattened torus with first and second flattened ends;
    a first light source adjacent to and transmitting a first light into the first end;
    a second light source adjacent to and transmitting a second light into the second end;
    a plurality of cuts formed into the first substantially annular surface, each cut of the plurality of cuts extending radially from the inner circumferential edge and lying along a corresponding geometric radius that extends outwardly from the center of the flattened torus toward the circumferential edges;
    a first substantially circular and substantially planar gauge (a first gauge) located on top of the first substantially annular surface and located over the plurality of cuts, the first gauge having indicia formed thereon;
    a second gauge located outside the flattened torus but also located between the first and second substantially annular parallel surfaces, the second gauge being located away from the first and second flattened ends;
    wherein, light from the first light source and light from the second light source propagate through the light-transmitting material of the flattened torus in opposite directions, at least some of said light from the light sources being emitted from the light-transmitting material and thereby illuminating both gauges.

* * * * *